United States Patent [19]
Modic et al.

[11] Patent Number: 6,166,134
[45] Date of Patent: Dec. 26, 2000

[54] POLYPROPYLENE RESIN COMPOSITION WITH TAPERED TRIBLOCK COPOLYMER

[75] Inventors: Michael John Modic, Richmond, Tex.; Norio Masuko, Tsukuba, Japan

[73] Assignee: Shell Oil Company, Houston, Tex.

[21] Appl. No.: 09/317,009

[22] Filed: May 24, 1999

Related U.S. Application Data

[60] Provisional application No. 60/086,926, May 27, 1998.

[51] Int. Cl.$^7$ .............................. C08L 47/00; C08L 53/02
[52] U.S. Cl. ................................ 525/89; 525/98; 524/451
[58] Field of Search ........................ 525/89, 98; 524/451

[56] References Cited

U.S. PATENT DOCUMENTS

| | | | |
|---|---|---|---|
| 4,847,150 | 7/1989 | Takeda | 428/318.8 |
| 4,918,130 | 4/1990 | Kano et al. | 524/499 |
| 4,939,208 | 7/1990 | Lanza et al. | 525/93 |
| 5,045,589 | 9/1991 | Ueno | 524/505 |
| 5,047,484 | 9/1991 | Tung | 525/314 |
| 5,256,734 | 10/1993 | Sugihara et al. | 525/98 |
| 5,278,252 | 1/1994 | Rhodes et al. | 525/314 |
| 5,346,964 | 9/1994 | Shibata et al. | 525/314 |
| 5,492,967 | 2/1996 | Djiauw et al. | 525/98 |
| 5,554,697 | 9/1996 | Van Dijk et al. | 525/314 |

FOREIGN PATENT DOCUMENTS

| | | | |
|---|---|---|---|
| 58029-842 | 2/1983 | Japan | C08L 23/12 |

OTHER PUBLICATIONS

"Block Copolymers," by D. C. Allport and W. H. Janes, Applied Science Publisher Ltd., London, (1973). pp. 82–86.

Primary Examiner—Rachel Gorr
Attorney, Agent, or Firm—Donald F. Haas

[57] ABSTRACT

The present invention is a unique polypropylene copolymer resin composition which comprises a propylene-ethylene copolymer having a melt flow rate of at least 50 g/10 min and an impact modifier which comprises a thermoplastic elastomer of a hydrogenated triblock copolymer which has a specific structure in which a block of a tapered increment of an vinyl aromatic hydrocarbon portion is arranged after the isoprene homopolymer block. Accordingly, the present invention provides a polypropylene resin composition comprising (a) 55 to 87% by weight of a propylene-ethylene block copolymer having a melt flow rate of at least 50 g/10 minutes; and (b) 3 to 20% by weight of an impact modifier which is comprised of at least 50% by weight of a hydrogenated block copolymer having a number average molecular weight between 50,000 and 150,000 and containing 15 to 25% by weight of an vinyl aromatic hydrocarbon, obtained by hydrogenating a triblock copolymer having the structure A-B-(A/B) wherein A is a vinyl aromatic hydrocarbon homopolymer, B is an isoprene homopolymer, and (A/B) is a block of a tapered isoprene-vinyl aromatic hydrocarbon copolymer, and the balance an olefinic rubber; and (c) 10 to 25% by weight of talc.

8 Claims, No Drawings

POLYPROPYLENE RESIN COMPOSITION WITH TAPERED TRIBLOCK COPOLYMER

This application claims the benefit of U.S. Provisional Application Ser. No. 60/086,926, filed May 27, 1998, the entire disclosure of which is hereby incorporated by reference.

FIELD OF THE INVENTION

The present invention relates to a polypropylene resin composition based on a high melt flow rate propylene-ethylene block copolymer. More specifically, it relates to a polypropylene resin composition comprising such a propylene-ethylene block copolymer and a specific tapered hydrogenated triblock copolymer, which has unique performance in terms of a combination of low temperature toughness, high elongation, and high flow.

BACKGROUND OF THE INVENTION

Propylene resins such as propylene homopolymer, propylene-ethylene block copolymer and propylene-ethylene random copolymer are generally excellent in heat and chemical resistance and moldability and they are cheap. Recently, they have been widely used as materials for molding various containers, domestic electrical products, films, yarns, and interior and exterior automotive trims. Especially for industrial moldings such as a bumper and interior and exterior trims of automobiles, a rubbery elastomer including ethylene-α-olefin copolymer rubber such as ethylene-propylene rubber and ethylene-butene rubber and a styrene thermoplastic elastomer is incorporated into the polypropylene resin for the purpose of improving an impact resistance of the polypropylene resin. Thereby a polypropylene resin composition is prepared. Thus, the resultant polypropylene resin composition has impact resistance equal to that of the conventional engineering plastic and it has been used as the molding material. For example, U.S. Pat. No. 5,346,964 illustrates a polypropylene resin composition comprising a hydrogenated styrene-butadiene block copolymer.

However, the rubber elastomer has defects since it lowers the stiffness and flowability when its amounts are increased in order to improve the impact resistance of the polypropylene resin. Therefore, in order to obtain a polypropylene resin composition having a good balance between the impact resistance (especially at a lower temperature) and the stiffness, various attempts have been made which have not yet been commercially successful. Moreover, new high melt flow rate polypropylene copolymers have been developed for which the conventional hydrogenated styrene-butadiene or isoprene block copolymer elastomers are ineffective. This invention provides a specific block copolymer modifier for high melt flow rate polypropylene copolymers that allows the production of polypropylene compositions with the desired combination of low temperature toughness, high elongation, and high flow.

SUMMARY OF THE INVENTION

The present invention is a unique polypropylene copolymer resin composition which comprises a propylene-ethylene copolymer having a melt flow rate of at least 50 g/10 min and a thermoplastic elastomer of a hydrogenated triblock copolymer which has a specific structure in which a block of a tapered increment of an vinyl aromatic hydrocarbon portion is arranged after the isoprene homopolymer block.

Accordingly, the present invention provides a polypropylene resin composition comprising (a) 55 to 87% by weight of a propylene-ethylene block copolymer having a melt flow rate of at least 50 g/10 minutes; and (b) 3 to 20% by weight of an impact modifier of which at least 50% by weight is a hydrogenated block copolymer having a number average molecular weight between 50,000 and 150,000 and containing 15 to 25% by weight of an vinyl aromatic hydrocarbon, obtained by hydrogenating a triblock copolymer having the structure A-B-(A/B) wherein A is a vinyl aromatic hydrocarbon homopolymer, B is an isoprene homopolymer, and (A/B) is a block of a tapered isoprene-vinyl aromatic hydrocarbon copolymer, and the balance, if any, is an olefinic rubber; and (c) 10 to 25% by weight of talc.

"Melt flow rate" means herein a value obtained by determining at 230° C. under 2.16 Kg load in accordance with JIS K7210.

The number average molecular weight means herein a value obtained by using gel permeation chromatography (GPC).

DETAILED DESCRIPTION OF THE INVENTION

The propylene-ethylene block copolymer of the component (a) of the present composition can be prepared by any one of the known methods. For example, it can be prepared in the presence of Ziegler-Natta catalyst by first polymerizing propylene to form a polypropylene portion and then copolymerizing a mixture of propylene and ethylene.

The propylene-ethylene block copolymer should have a melt flow rate of at least 50 g/10 minutes. When the melt flow rate is less than 50 g/10 minutes, the advantages of the invention are not achieved. Preferably, the melt flow rate is 60 to 80 g/10 minutes. Furthermore, it is preferred that the stereoregularity of this copolymer be greater than 98 mole % isotactic. This means that the isotactic content of the copolymer should be greater than 98 mole %.

The hydrogenated block copolymer of the modifier, component (b), of the present composition has the structure structure A-B-(A/B) wherein A is a vinyl aromatic hydrocarbon homopolymer, B is an isoprene homopolymer, and (A/B) is a block of a tapered isoprene-vinyl aromatic hydrocarbon copolymer. The tapered A/B portion of the block copolymer has mers of isoprene and vinyl aromatic hydrocarbon but the concentration of B mers is greatest at the end adjacent to the B homopolymer block and gradually decreases in the direction of the other end of the polymer so that the concentration of the A mers is greatest at that end of the polymer.

The impact modifier may include up to 50% by weight of an olefinic rubber along with the tapered block copolymer. The olefin rubber may be any of the commonly used impact modifiers of this type including ethylene-propylene rubber, EPDM, and metallocene-based elastomers such as ethylene-butylene and ethylene-octene copolymers.

The composition of this invention has from 10 to 25% by weight talc. The talc is used to increase stiffness and dimensional stability of the part which is made from this composition. The preferred talc has platelet-shaped particles of less than 5 microns in size.

The vinyl aromatic hydrocarbon which forms (A/B) block or A block of the hydrogenated block copolymer may be styrene; alkyl substituted styrenes such as α-methyl styrene, p-methyl styrene and p-tert-butyl styrene; alkoxy substituted styrenes such as p-methoxy styrene, vinyl naphthalene and alkyl-substituted naphthalenes. Among them, styrene is particularly preferable.

The content of the vinyl aromatic hydrocarbon in the hydrogenated block copolymer is 15 to 25% by weight, preferably 18 to 22% by weight. When it is less than 15% by weight, stiffness, heat distortion resistance, and strength of the polypropylene resin composition are poor. When it is over 25% by weight, the hydrogenated block copolymer is not sufficiently soft and elastic.

The hydrogenated block copolymer has a number average molecular weight from 50,000 to 150,000, preferably 70,000 and 125,000, more preferably 80,000 to 115,000. When it is less than 50,000, the elongation of the composition is hardly maintained. The heat distortion resistance of the composition is also lowered. On the other hand, when it is over 150,000, processability becomes unacceptably low for thin walled moldings.

The hydrogenated block copolymer can be prepared in accordance with known living anionic polymerization methods in the presence of an alkyl lithium initiator in a hydrocarbon solvent. That is, for example, a desired amount of styrene is introduced in a reactor and then polymerization starts. Isoprene is polymerized to form an isoprene homopolymer.

The tapered block is polymerized by adding a mixture of the isoprene and styrene in absence of a randomizing agent and controlling the temperature of the reactor in the range of 10 to 120° C. The isoprene monomer is exhausted first and the end of the tapered block is formed of almost all homopolystyrene. The conditions for the preparation of the tapered copolymer block are as disclosed in U.S. Pat. No. 3,775,329 which is herein incorporated by reference.

The random nature of the distribution of the mers is controlled by introducing each of the monomers to the reactor at a rate of 15% to 75%, preferably 15 to 50%, by weight of the total tapered block monomer charge per minute, and using the monomers in amounts such that the weight ratio of the styrene to the isoprene ranges from 0.5:1 to 1.5:1. This facilitates dispersion of sufficiently small styrene segments between isoprene segments to produce desired finished product properties.

The resultant block copolymer is hydrogenated in accordance with any one of the known methods (for example, the method as disclosed in U.S. Pat. 3,700,633 which is herein incorporated by reference) to obtain the hydrogenated block copolymer. In the hydrogenated block copolymer of the present invention, at least 80%, preferably at least 90%, more preferably at least 95% of the double bonds in the isoprene should be hydrogenated and saturated. When the hydrogenation degree is less, the composition is easily subjected to heat deterioration during the mixing with the propylene-ethylene block copolymer and/or the molding of the composition. In this case, the resultant polypropylene resin composition has poor thermal and/or weather resistance. The hydrogenation degree can be analyzed using the nuclear magnetic resonance (NMR) method. After the hydrogenation, the hydrogenated block copolymer can be recovered using the known method as a polymer crumb.

The polypropylene resin composition of the present invention is a mixture comprising 55 to 87% by weight of (a) the propylene-ethylene block copolymer and 3 to 20% by weight of impact modifier (b) which contains at least 50% by weight of the hydrogenated block copolymer. When the proportion of the modifier is less than 3% by weight, the impact resistance of the composition, especially at lower temperature, cannot be sufficiently improved. On the other hand, when it is over 20% by weight, the stiffness of the composition as a molding material is lowered and its processability is also lowered. Such a composition is not suitable as a molding material for thin walled part applications.

The polypropylene resin composition of the present invention can be prepared by melt mixing (a) the propylene-ethylene block copolymer with (b) the hydrogenated block copolymer and then pelletizing. Preferably, two sorts of materials are dry blended in a suitable apparatus such as Henschel mixer, a tumbling mixer, or a ribbon blender and then kneaded through a twin-screw extruder at a melting temperature of 180 to 250° C. If necessary, various additives including an antioxidant, a UV absorber, a thermal stabilizer, a lubricant, a pigment, an antistatic agent, a higher fatty acid salt, and a nucleating agent may be added to a composition of the present invention. The polypropylene resin composition of the present invention is useful in various molding methods such as injection molding, extrusion molding, compression molding, and hollow molding so as to prepare various moldings.

EXAMPLES

The present invention will be further explained by referring to the following non-limiting examples. Physical properties shown in Examples were determined in accordance with the following:

| (1) notched Izod impact strength | JIS K7110 |
| (2) modulus in flexure | JIS K7203 |
| (3) melt flow at 230° C., 2.16 kg wt | JIS K7210 |
| (4) elongation at break | ASTM D638 |

Natures of polypropylene-ethylene block copolymers used as the component (a) are shown below.
(1) PP1—melt flow rate greater than 50
(2) PP2—melt flow rate less than 50

Next, the block copolymers used were hydrogenated such that at least 98% of the double bonds were saturated. The properties of each of the thus-obtained hydrogenated copolymers are shown in Table 1. Styrene content, hydrogenation degree, and blockiness of styrene were determined by the nuclear magnetic resonance (NMR) method. Molecular weight of the block of the styrene homopolymer and the styrene segment distribution of the tapered segment was determined by subjecting a sample prior to the hydrogenation to ozone degradation in order to remove all of the isoprene segments. The resulting solution of styrene segments was then subjected to the gel permeation chromatography (GPC). The hydrogenated block copolymer was recovered as a solid crumb, which was used to prepare a polypropylene composition.

TABLE 1

| Block Copolymer | Polymer[1] Structure | Styrene Content (%) | Block-iness[3] (%) | $M_n$[2] of Polymer | Hydrogenation Degree (%) |
| --- | --- | --- | --- | --- | --- |
| A | S-EP-(S/EP) | 21.5 | 90 | 94,000 | >98 |
| B | S-EP-(S/EP) | 22 | 82 | 107,300 | >98 |
| C | S-EP-S | 18 | 100 | 95,000 | >98 |

[1])EP : block of hydrogenated isoprene homopolymer
S/EP : block of hydrogenated isoprene-styrene tapered copolymer
S : block of styrene homopolymer
[2])The number-average molecular weight.
[3])A measurement of the portion of the styrene mers which are in discrete blocks as opposed to randomly distributed.

A formulation according to the present invention was made with PP-1 and Block Copolymer A and about 21% by weight talc and its properties were measured. Analogous formulations were made with PP-1 and the linear Block Copolymer C and PP-2 and C and PP-2 and A, which are all outside the scope of the invention. The proeprties are compared in Table 2.

TABLE 2

|  | PP-1 (high flow) | | PP-2 (low flow) | |
| --- | --- | --- | --- | --- |
|  | C | A | C | A |
| melt flow rate | 22.3 | 22.3 | 21.2 | 20.8 |
| elongation at break | 111 | 454 | 500 | 500 |
| flexural modulus | 2001 | 1928 | 1712 | 1536 |
| NI-RT[1] | 523 | 537 | 654 | 576 |
| NI- −30° C.[2] | 61 | 75 | 78 | 78 |

[1] notched Izod on a ¼," bar at room temperature
[2] notched Izod on a ¼," bar at −30° C.

The invention formulation PP-1/A gives much higher elongation at break and low temperature impact strength (NI-30° C.) than PP-1/C with nearly equivalent melt flow rate, flexural modulus, and room temperature impact. PP-1/A had considerably better flexural modulus than the formulations made with the low melt flow rate propylene-ethylene copolymer with elongation at break and low temperature impact which is very close.

In other tests, the polymers of this invention, A and B, gave unique and superior performance in compositions with the high melt flow rate polypropylene copolymer as compared to the conventional SEPS polymer. The combination of low temperature toughness, high elongation, and high flow was much better and is considered to be sufficient for commercial use in automotive interior and exterior applications. A gave better performance than B and it is believed that this is because of the higher percentage of blockiness. The lower blockiness content is thought to be a consequence of a longer tapered segment. If the tapered segment is too large it will effectively act as a low temperature "hard phase" and the low temperature impact properties are reduced. It is preferred that the % blockiness of the copolymer be 80 to 95 by weight, most preferably 85 to 92%.

We claim:

1. A polypropylene resin composition comprising
   (a) 55 to 87% by weight of a propylene-ethylene block copolymer having a melt flow rate of at least 50 g/10 minutes; and
   (b) 3 to 20% by weight of an impact modifier which is comprised of at least 50% by weight of a hydrogenated block copolymer having a number average molecular weight from 50,000 and 150,000, containing 15 to 25% by weight of an vinyl aromatic hydrocarbon, and having the structure A-B-(A/B) wherein A is a vinyl aromatic hydrocarbon homopolymer, B is an isoprene homopolymer, and (A/B) is a block of a tapered isoprene-vinyl aromatic hydrocarbon copolymer, and the balance an olefinic rubber; and
   (c) 10 to 25% by weight of talc.

2. The composition of claim 1 wherein the melt flow rate of (a) is 60 to 80 g/10 minutes.

3. The composition of claim 2 wherein the stereoregularity of (a) is greater than 98 mole % isotactic.

4. The composition of claim 1 wherein the molecular weight of the block copolymer of (b) is 70,000 to 125,000.

5. The composition of claim 4 wherein the molecular weight of the block copolymer of (b) is 80,000 to 115,000.

6. The composition of claim 1 wherein the vinyl aromatic content of the block copolymer of (b) is 18 to 22%.

7. The composition of claim 1 wherein the blockiness of the block copolymer of (b) is from 80 to 95% by weight.

8. The composition of claim 7 wherein the blockiness of the block copolymer of (b) is from 85 to 92% by weight.

* * * * *